United States Patent [19]

Markham

[11] 4,450,388
[45] May 22, 1984

[54] DYNAMIC BRAKING OF DIRECT CURRENT MOTORS

[75] Inventor: John D. Markham, Droylsden, England

[73] Assignee: Associated Electrical Industries Limited, England

[21] Appl. No.: 435,951

[22] Filed: Oct. 22, 1982

[30] Foreign Application Priority Data

Oct. 26, 1981 [GB] United Kingdom ................. 8132208

[51] Int. Cl.³ ............................................. H02P 3/12
[52] U.S. Cl. ....................................... 318/87; 318/56; 318/60; 318/63; 318/86; 318/376
[58] Field of Search ........................ 318/56, 57, 60, 63, 318/86, 87, 375, 376, 377, 378, 379, 380, 381

[56] References Cited

U.S. PATENT DOCUMENTS 2,248,577 7/1941 McNairy ........................... 318/63 X
4,092,577 5/1978 Markham ....................... 318/377 X

FOREIGN PATENT DOCUMENTS 1071841 5/1963 United Kingdom ........... 318/377 X
1585261 5/1977 United Kingdom ........... 318/377 X Primary Examiner—G. Z. Rubinson
Assistant Examiner—Bentsu Ro
Attorney, Agent, or Firm—Kirschstein, Kirschstein, Ottinger & Israel

[57] ABSTRACT

A dynamic braking system for a D.C. traction motor which is driven from an asymmetric bridge rectifier having freewheel diodes to permit circulation of motor generated current. The system employs field reversal to ensure a generated (braking) current direction the same as for motoring and this facility permits injection current braking by phasing up the supply bridges when the motor is braking with full excitation. The brake resistance is in two parts one of which forms an uncontrolled arm of the bridge, this part of the resistance being shunted by a thyristor. Part way through an injection braking process the supply bridge is phased down, the resistance bridge arm shorted out and the supply bridge phased up again. Lower losses and greater braking efficiency result.

8 Claims, 5 Drawing Figures

DYNAMIC BRAKING OF DIRECT CURRENT MOTORS

This invention relates to dynamic braking of direct current (D.C.) electric motors and particularly to the dynamic braking of D.C. traction motors.

Rheostatic braking is commonly used on railway locomotives powered by diesel engine, direct current or alternating current (A.C.) supply systems. In such systems using separately excited motors the motor armature is commonly switched from the power supply to a braking or load resistor, in a braking operation, to dissipate energy generated by the motor by virtue of the inertia of the locomotive after the driving power has been switched off.

With a unidirectional supply arrangement (such as a bridge rectifier) it is of course necessary to arrange the direction of the generated current to be the same as that of the normal driving current from the supply, this being achieved by reversing the direction of the field. This reversal of the field for rheostatic braking permits enhancement of the braking effect by providing a normal motor driving current to the armature thus having the effect of tending to drive the motor in the (normally) reverse direction. The braking effect can thus be increased even at greatly reduced speed by such additive injection of supply current.

U.K. Pat No. 1,585,261 describes an arrangement which incorporates this injection braking facility in such a manner as to overcome the disadvantage that operation of the supply (with reversed field) can in some circumstances cause shorting of the motor armature (considered as a generating source) and consequent damage.

FIG. 1 of the above patent specification illustrates the basic arrangement liable to damage, and FIG. 2 illustrates one example of an arrangement incorporating the facility which permits injection braking.

The circuit as shown in FIG. 2 of U.K. Pat. No. 1,585,261 is reproduced as FIG. 1 of the accompanying drawings. Two D.C. traction motors have armatures connected in parallel across a D.C. source which comprises two asymmetric thyristor bridges connected with their D.C. paths in series. Each motor armature 2 is connected in series with its own load or brake resistor 3. Each of these series circuits is closed by a brake contactor BC, the brake contactor and brake resistor 3 having a motor contactor MC connected across them to short-circuit them for normal motoring operation. Opening this latter contactor in any braking situation will thus ensure that the motor armature cannot be short-circuited by the free-wheeling bridge diodes 9.

The separately excited field windings 10 of the motors 2 are connected by reversing switches 4 and field contactors FC to controllable D.C. sources 15 comprising phase-controlled thyristor bridges fed from a further winding on the transformer 8.

It is an object of the present invention to provide a dynamic braking system for a D.C. traction motor, such as described in U.K. Pat. No. 1,585,261, in which the power required from the supply is significantly reduced.

According to one aspect of the present invention, in a dynamic braking system for a D.C. motor, the motor armature being connected in a unidirectional current path which includes a controllable current source and brake resistance, at least one portion of the brake resistance can be bypassed selectively, the system including means for reversing the relative directions of field and armature current to permit rheostatic braking by the dissipation in the brake resistance of energy generated by the motor in a braking condition and to permit injection braking by reverse driving of the motor, the system further including control means responsive to the total armature current in a braking condition to effect first rheostatic braking then additionally injection braking, a portion of the brake resistance being bypassed at a predetermined braking condition to reduce the power loss from the controllable current source in the brake resistance.

There may be two equal portions of the brake resistance, the control means being arranged to reduce the injection braking to zero and bypass one portion of the brake resistance when the injected power is equal to the motor generated power, the injected braking current being then increased under total armature current control.

The ratio of the bypassed to the unbypassed portion of brake resistance may be such that injection braking can be discontinued on operation of the brake resistance bypass in circumstances where a constant braking effort is required to maintain a constant speed.

According to another aspect of the invention, in a method of operating a dynamic braking system incorporating a D.C. motor, the motor armature being connected in a unidirectional current path which includes a controllable current source and brake resistance, bypassing means for bypassing selectively at least one portion of the brake resistance, and means for reversing the relative directions of field and armature current, braking is effected by switching off the current source, reversing the armature and field current relative directions to cause rheostatic braking, increasing the supply of current from the controllable current source to provide injection braking, reducing the injection braking to zero at a predetermined value of injection current, bypassing a portion of the brake resistance and again increasing the injection braking current.

A dynamic braking arrangement for two separately excited D.C. motors will now be described, by way of example, with reference to the accompanying drawings of which:

FIG. 1 is a diagrammatic circuit of a braking arrangement employing injection braking and known from U.K. Pat. No. 1,585,261;

Figure 1:
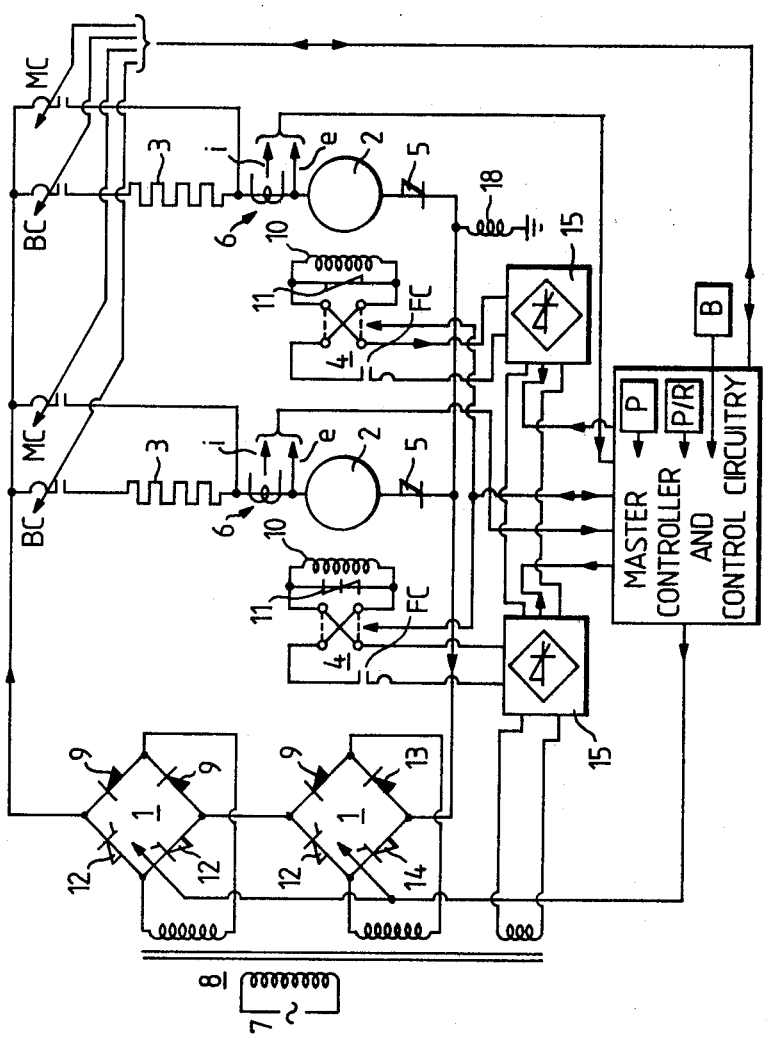

FIG. 1 has already been described broadly above and in detail in U.K. Pat. No. 1,585,261.

Figure 2:
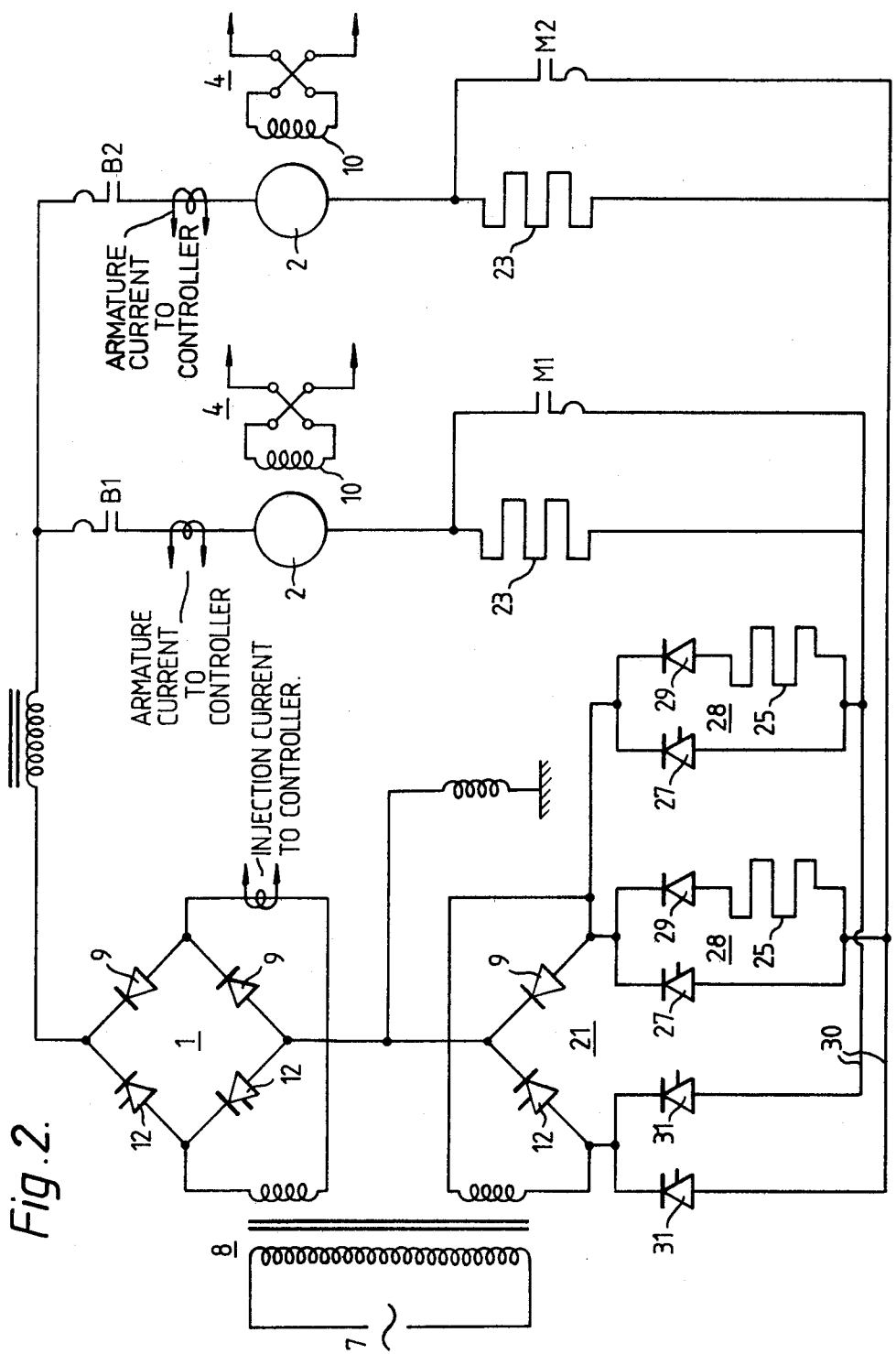
FIG. 2 is a diagrammatic circuit of a braking arrangement in accordance with the present invention.

FIG. 2 is similar to FIG. 1 in that two series connected rectifier bridges (1, 21) are used to supply the armatures of separately excited traction motors 2. The upper bridge 1 is exactly as in FIG. 1 but the lower bridge 21 is modified to accommodate part of the braking resistor 3 of FIG. 1. Thus, the normal freewheel negative end diode 13 of FIG. 1 is replaced by parallel branches 28 to each of the motors. Each branch comprises a thyristor 27 shunting a series connected diode 29 and part (25) of the brake resistor referred to above.

The remaining part (23) of each brake reistor is connected as in FIG. 1, directly in series with the armature of the respective motor 2. Since it is required that the two motor braking circuits be isolated, the negative end terminals 30 of the branches 28 are connected to respective negative end thyristors 31 constituting the remaining arm of the bridge 21.

It will be seen that the brake resistors 25 therefore remain in circuit or not according to whether the associated thyristor 27 is 'off' or 'on'.

The thyristors 27 when operating in the motoring mode, are always fired at the beginning of their conducting half cycle so that they act solely as diodes. In braking, however, they are (initially at least) not fired and the rheostatic brake circuit is thus completed via the portion of brake resistance 25 and diode 29 which now form that arm of the bridge 21. The circuit in FIG. 2 is otherwise similar to that of FIG. 1.

Figure 3:
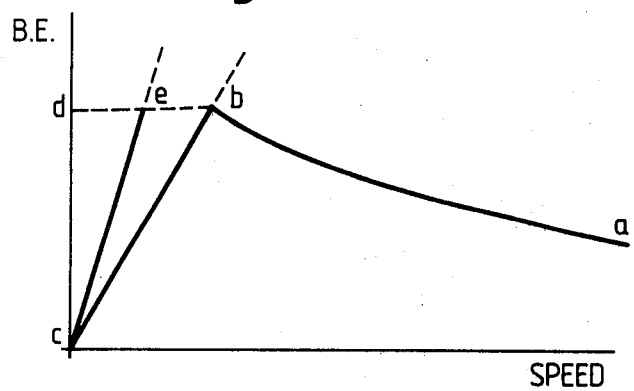
FIG. 3 is a braking effort characteristic.
Figure 4:
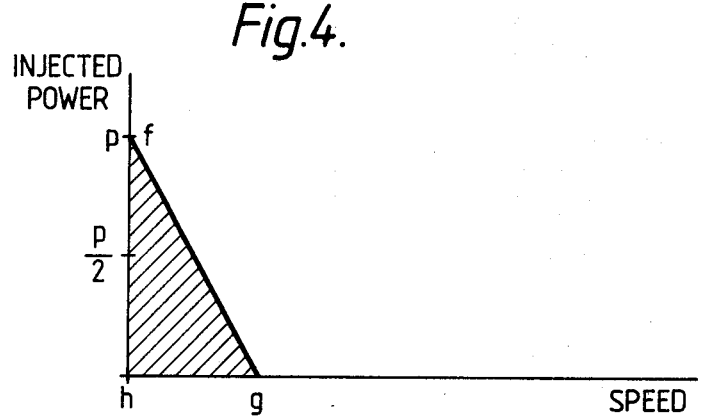
FIGS. 4 and 5 show diagrams of the power injection necessary in the prior art and in the embodiment shown in FIG. 2.
Figure 5:
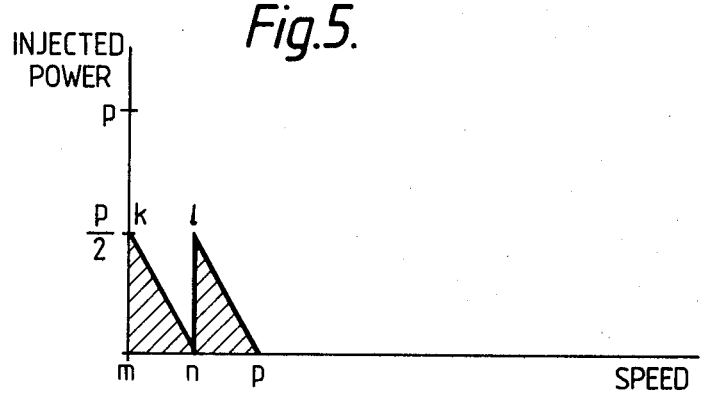

The braking procedure for the circuit of FIG. 2, will now be described by reference to FIGS. 3, 4 and 5. Initially the bridges 1 and 21 are phased down to zero output, thus removing driving power from the motors 2 prior to braking. Each motor 2 is then running at a substantial speed and its inertia and that of the locomotive to which it is coupled tend to maintain this speed. The motor can thus act as a generator and by reversing the field excitation at this point, a current is generated in the same direction as the original driving current. This generated current series circuit consisting of the armature, braking resistor 23, braking resistor 25, diode 29 and freewheeling diodes 9. The dissipation of energy resulting from the flow of this armature current through the braking resistors produces a braking effect on the locomotive. As the motor slows, the field excitation is automatically increased to tend to maintain or increase the armature current and the braking effort (B.E.), as shown by the section ab of the characteristic of FIG. 3. When the point b in FIG. 3 has been reached by such rheostatic braking, the field excitation is at a maximum and the armature current would then start to fall as the speed falls further. Braking effort would then decrease along the solid line bc. However, plugging i.e., injection braking, can then be employed by 'phasing-up' bridge 1 under armature current control to maintain the total armature current and thus the braking effort, constant. In this condition the rheostatic braking effort is supplemented by reverse driving power from the supply.

The injected power from bridge 1 could be increased from point b down to standstill to maintain the braking effort constant from b to d. This was the procedure described in the above patent specification and it results in a characteristic of injected power such as that of FIG. 4, i.e., increasing continuously to a maximum at standstill.

It will be apparent that the braking resistance 23/25 which provides the rheostatic braking, also produces a pure power loss as far as the injected current is concerned. In the arrangement of FIG. 2, therefore, the brake resistor is not retained wholly in circuit for the whole braking period. When the ratio of the increasing power supplied by bridge 1 to the falling power produced by the motor is equal to the ratio of the power dissipated in the two portions 25 and 23 of the brake resistance the thyristors 27 in the diode arm of the lower bridge are fired, effectively short circuiting the resistances in the lower bridge arm. Firing of the thyristors in the top bridge is suppressed at the same time. The effective load ohms per motor are thus reduced, along with the level of power injection at this point as shown by the section ln of the diagram of injection power in FIG. 5. Without further injection of power, braking effort would decline below this "transition" speed along the maximum excitation line ec of FIG. 3. Maintenance of the peak braking effort at e can again be achieved by phasing up the bridge 1 while thyristors 27 of bridge 2 are fully conductive to bypass the part-resistors 25. Braking effort will then be maintained from e to d in FIG. 3, i.e. down to standstill, but at a much lower level of injected power.

In some circumstances it may be desirable to maintain the locomotive at a certain low and constant speed, for example on very long downward inclines. It can be arranged that this speed coincides with the transition speed value at e in FIG. 3, in which case the injected power can be reduced to zero (by phasing down bridge 1), the brake resistor portion 25 being shorted out by the thyristor 27. There will then be no need to re-impose injection braking since there is no requirement to stop the train. In such a case a considerable energy saving is achieved in relation to that required by the arrangement of FIG. 1. If the desired speed in such circumstances (long declines) is closer to zero than to the initial plug braking speed, then the switched resistor portion 25 will be correspondingly greater than the portion 23. Thus the ratio of the part braking resistors 25 and 23, can be other than 1:1 to accommodate or to determine the ratio of injected power to generated power at which the shorting out of resistor 25 occurs.

It will be appreciated that the total brake resistor could be divided, and switched, in more than two portions 23/25, with a corresponding reduction in peak injected power, but only with the penalty of more, expensive, components and bulkier equipment.

The controlled source may be other than an asymetric AC bridge, for example a thyristor chopper with a freewheel circuit. It is a requirement that it have a permanent unidirectional low impedance path to permit the circulation of motor generated current.

In a further modification of the above described braking system the motor may be a series motor with armature current reversal for braking.

I claim:

1. A dynamic braking system for a D.C. motor, the system comprising a undirectional current path including a controllable current source, a motor armature and a brake resistance, said brake resistance comprising a portion associated with bypass means, the system further comprising means for reversing the relative directions of field and armature current to permit rheostatic braking by the dissipation in said brake resistance of energy generated by the motor in a braking condition and to permit injection braking by reverse driving of the motor, and control means responsive to the total armature current in a braking condition to effect first rheostatic braking then additionally injection braking, said control means being responsive to injected armature current to effect bypassing of said portion of brake resistance at a predetermined braking condition.

2. A dynamic braking system according to claim 1, wherein said brake resistance comprises two equal portions and said control means is operative to bypass the first mentioned portion when the power supplied by said controllable current source is equal to the motor generated power, the injected braking current being then increased from zero under total armature current control.

3. A dynamic braking system according to claim 1, wherein the ratio of the bypassed to the unbypassed portion of brake resistance is such that injection braking can be discontinued on operation of the brake resistance bypass in circumstances where a constant braking effort is required to maintain a constant speed.

4. A dynamic braking system according to claim 1, wherein said controllable current source includes an A.C. source and an asymmetric semiconductor bridge rectifier comprising controlled arms and series connected uncontrolled arms, one of said uncontrolled arms comprising said portion of said brake resistance and a semiconductor bypass switch.

5. A dynamic braking system according to claim 4, including at least one further asymmetric semiconductor bridge rectifier which is phase controlled for motoring and for injection braking.

6. A dynamic braking system according to claim 4, wherein said bridge rectifier comprises two controlled arms, each including a thyristor, connected in series between the bridge D.C. terminals, and two uncontrolled arms, each including a diode rectifier, in series between D.C. terminals of the bridge, one of said uncontrolled arms comprising a portion of brake resistor connected in series with the diode rectifier, the portion of brake resistor and the diode rectifier being together shunted by a thyristor.

7. A railway traction system including a dynamic braking system according to claim 6, wherein a plurality of D.C. motors have their armatures connected in series with respective brake resistances and wherein each motor circuit has a respective controlled arm and a respective uncontrolled arm connected to A.C. terminals of the bridge rectifier.

8. A method of operating a dynamic braking system incorporating a D.C. motor, the motor armature being connected in a unidirectional current path which includes a controllable current source and brake resistance, bypassing means for bypassing selectively at least one portion of the brake resistance, and means for reversing the relative directions of field and armature current, the method being effected by switching off the current source, reversing the armature and field current relative directions to cause rheostatic braking, increasing the supply of current from said controllable current source to provide injection braking, reducing the injection braking to zero at a predetermined value of injection current, bypassing a portion of the brake resistance and again increasing the injection braking current.

* * * * *